(12) United States Patent
Feller et al.

(10) Patent No.: US 9,514,307 B2
(45) Date of Patent: *Dec. 6, 2016

(54) METHOD FOR PRODUCING A SECURED DATA OBJECT AND SYSTEM

(71) Applicant: cp.media AG, Baar (CH)

(72) Inventors: Olaf Feller, Ribeauville (FR); Burkhardt Brennecke, Berlin (DE)

(73) Assignee: CP.MEDIA AG, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/911,610

(22) Filed: Jun. 6, 2013

(65) Prior Publication Data
US 2013/0333050 A1    Dec. 12, 2013

(30) Foreign Application Priority Data
Jun. 7, 2012 (DE) .......... 10 2012 104 947

(51) Int. Cl.
| | | |
|---|---|---|
| G06F 21/60 | (2013.01) | |
| G06F 21/64 | (2013.01) | |
| H04L 9/00  | (2006.01) | |
| H04L 29/06 | (2006.01) | |

(52) U.S. Cl.
CPC .............. *G06F 21/60* (2013.01); *G06F 21/64* (2013.01); *H04L 9/00* (2013.01); *H04L 63/00* (2013.01)

(58) Field of Classification Search
CPC ............ H04L 9/00; H04L 9/32–9/3297; H04L 63/04–63/0492; H04L 63/08–63/0892; G06F 15/16; G06F 21/30–21/46; G06F 21/60–21/645; G06F 9/00; H04M 1/66
USPC .............. 726/26–33; 713/156, 157, 175–180
See application file for complete search history.

(56) References Cited

U.S. PATENT DOCUMENTS

| | | | | |
|---|---|---|---|---|
| 5,751,809 A * | 5/1998 | Davis | ............ | H04L 9/3236 380/200 |
| 6,601,172 B1 * | 7/2003 | Epstein | .................. | 713/178 |
| 8,312,284 B1 * | 11/2012 | Zheng | ............ | H04L 9/3247 713/178 |
| 2002/0116509 A1 * | 8/2002 | DeLaHuerga | ............ | 709/229 |

(Continued)

FOREIGN PATENT DOCUMENTS

| | | |
|---|---|---|
| EP | 2437186 | 4/2012 |
| WO | WO9940702 | 8/1999 |
| WO | WO2010/139616 | 12/2010 |

*Primary Examiner* — Linglan Edwards
*Assistant Examiner* — Quazi Farooqui
(74) *Attorney, Agent, or Firm* — Harness, Dickey

(57) ABSTRACT

A method is provided for producing a secured data object by means of a data processing device. The method includes: generating a data representation value in each case at the end of an interval having a first interval length which is assigned to the data sets of the respective interval of first length, receiving a first time stamp assigned to the respective data representation value, storing the respective data representation value together with the assigned first time stamp, generating an interval representation value in each case at the end of an interval having a second interval length which is greater than the first interval length which is assigned to the data representation values of the respective interval of second length, receiving a second time stamp assigned to the respective interval representation value and storing the respective interval representation value together with the associated second time stamp.

15 Claims, 2 Drawing Sheets

(56) References Cited

U.S. PATENT DOCUMENTS

| | | | |
|---|---|---|---|
| 2007/0214363 A1* | 9/2007 | Ishii .............................. | 713/178 |
| 2009/0044010 A1* | 2/2009 | Hughes ................... | G06F 21/64 |
| | | | 713/165 |
| 2012/0084569 A1* | 4/2012 | Feller .................... | G06F 21/645 |
| | | | 713/178 |

* cited by examiner

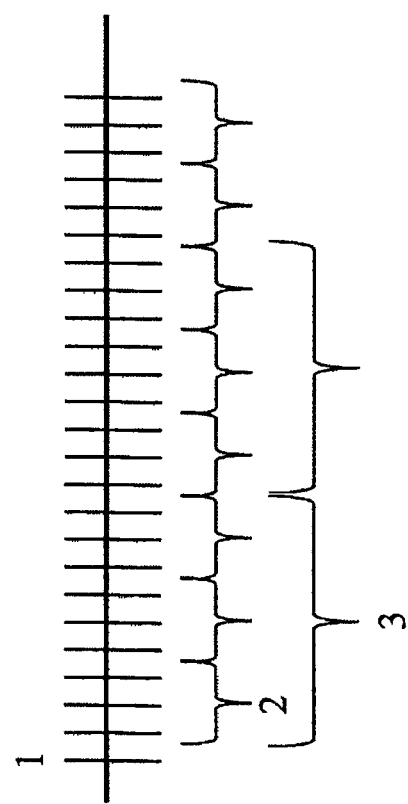

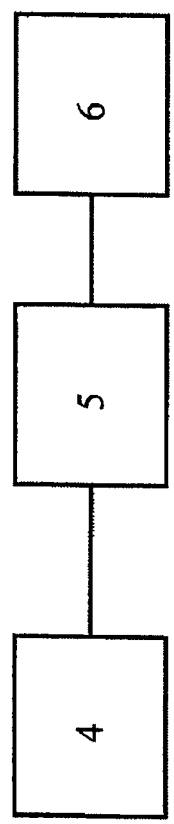

METHOD FOR PRODUCING A SECURED DATA OBJECT AND SYSTEM

CROSS-REFERENCE TO RELATED APPLICATIONS

This application claims the benefit and priority of German Application No. 10 2012 104 947.5, filed Jun. 7, 2012. The entire disclosure of the above application is incorporated herein by reference.

FIELD

The present disclosure relates to a method for producing a secured data object and system.

BACKGROUND

In many medical actions disputes can arise between the patient and the medical staff regarding the results and consequences of the medical treatment. Thus, for example, in connection with the explanation of the intervention which, in the view of the Federal Supreme Court, is to be conducted in the form of a conversation between physician and patient and not by means of forms and leaflets, relating to the diagnosis, the therapy and the progress, the treatment alternatives and the treatment risks of a certain disease, medical operations and the care of the patient in the areas of emergency admission and intensive care units, particularly when serious consequences arise for the patient.

At the same time, there is currently no audio-visual archiving of the course of the operation and/or treatment in order that in possible subsequent treatments of the patient, the treating physician can then, with the agreement of the patient, acquire objective reliable information about the previous health history of the patient.

A video recording of the operation can provide assistance for the furnishing of evidence here both for the physician and the patient. Here however it must be ensured that the video recording actually reproduces all the actions and occurrences during the operation. A subsequent manipulation of the video material must be eliminated so that the video can be used as evidence.

The document EP 2 437 186 A1 discloses a method for producing a secure data set by means of a software application which is executed on a data processing system. Legally secure image data can be created with the method.

The document U.S. Pat. No. 5,751,809 discloses an apparatus and a method for secure recording and archiving of video data. The video data are signed digitally together with a status parameter and provided with a time stamp.

A video monitoring system is described in the document WO 2010/139619 A1. The system comprises at least one video camera, a server for data processing and encryption and a digital archive for the video data.

This section provides background information related to the present disclosure which is not necessarily prior art.

SUMMARY

This section provides a general summary of the disclosure, and is not a comprehensive disclosure of its full scope or all of its features.

It is the object of the disclosure to provide a method and a system by which means a data object can be generated so that the data object is secure from manipulation.

This object is solved according to the disclosure by a method for generating a secured data object according to the independent claim 1 and a system according to the independent claim 15. Advantageous embodiments of the disclosure are the subject matter of dependent subclaims.

According to one aspect, the disclosure comprises a method for producing a secured data object by means of a data processing device, wherein a digital data stream which comprises a continuous sequence of data sets is received by the data processing system and the method comprises the following steps:
  generating a data representation value in each case at the end of an interval having a first interval length which is assigned to the data sets of the respective interval of first length,
  receiving a first time stamp assigned to the respective data representation value,
  storing the respective data representation value together with the assigned first time stamp,
  generating an interval representation value in each case at the end of an interval having a second interval length which is greater than the first interval length which is assigned to the data representation values of the respective interval of second length,
  receiving a second time stamp assigned to the respective interval representation value and
  storing the respective interval representation value together with the associated second time stamp.

According to a further aspect of the disclosure, a system is disclosed comprising a video recording device, a data processing device and a data storage device, wherein the video recording device is configured to transfer a data stream to the data processing device and the data processing device is configured to process the data stream and then store it as a secured data object in the data storage device.

The method is implemented by means of a data processing device. The data processing device can, for example comprise one or more processors as well as a memory having a volatile (e.g. random access memory) and a non-volatile (e.g. hard disk) memory area. Furthermore, the data processing device can comprise communications devices for receiving and/or transmitting data and/or data streams, for example a network connection (LAN—local area network), a connection for a wireless network (WLAN—wireless local area network), a USB connection (USB—universal serial bus), a Bluetooth adapter and/or a Firewire connection (IEEE 1394). The data processing device can be connected to a display device. Alternatively a display device can be integrated in the data processing device.

According to the method according to the disclosure, a nesting of time stamps is provided. Representation values of data objects of a data stream are provided with time stamps at certain intervals. The representation values and the time stamps assigned to them in each case are stored together. The method for securing the data stream is also designated by the applicant as "SecStream".

Electronic time stamps according to ISO18014-1 are generally digital data with which the existence of certain data before a certain time point can be proven. Frequently, as for example in the Time Stamp Protocol from RFC3161, time stamps are created using digital signatures. Thus, time stamps are an electronic certification that the data signed with the time stamp have been present at the time of signature in the signed form.

An advanced time stamp (also designated as advanced electronic signature) is an electronic signature which enables the authenticity and unadulteratedness of the data signed by it to be checked. According to the EC Directive 1999/93/EC, an advanced time stamp should meet the following requirements: It should be assigned exclusively to one signatory. An identification of the signatory should be ensured. The advanced time stamp should be produced by means which the signatory can keep under his exclusive control. Finally the advanced time stamp should be linked to the data to which it relates such that a subsequent amendment of the data can be identified. An advanced time stamp is usually produced by means of a software application. The software application enables various advanced time stamps to be generated at short time intervals one after the other.

A qualified time stamp (also designated as qualified electronic signature) is understood as an advanced electronic signature which is based on a qualified certificate valid at the time of its generation and which was created with a secure signature creation device (SSEE). Qualified time stamps can only be created by accredited suppliers (trusted timestamp authority). Electronic data with a qualified time stamp can be checked for their validity for a period of at least 30 years. The qualified time stamp provides a high security against falsification of the data. The qualified time stamp is usually created by means of a signature card which is read out by a reader. The generation of a qualified time stamp therefore usually takes longer than the generation of an advanced time stamp.

A qualified certificate in accordance with the EC Directive 1999/93/EC is a digital certificate which has the following contents: information that the certificate is issued as a qualified certificate, details of the issuer and the country in which he is resident, the name of the owner or a pseudonym which should be identified as such, possibly further attributes of the owner, a signature check key of the owner, beginning and end of the duration of validity of the certificate, a serial number of the certificate, the advanced electronic signature of the issuing certification service provider, possibly restrictions on the range of validity of the certificate and possibly restrictions on the value of the transactions for which the certificate can be used. The issuer of the qualified certificate must meet the requirements of the guidelines for the reliability and the security of his certification services.

The properties of the secure signature creation device (SSEE) are also defined in the EC Directive 1999/93/EC. The SSEE should ensure that the created signature keys can in practice only occur once and their secrecy is sufficiently ensured. Furthermore it should not be possible to deduce the signature keys with sufficient certainty and the signature should be protected from forgeries by using the respectively available technology. Finally it should be possible to reliably protect signature keys of the rightful signatory from use by others. The SSEE should not amend the data to be signed and should not prevent these data being presented to the signatory before the signature process.

The generation of advanced time stamps scales with the processor capacity of the data processing device. On a conventional standard computer, for example, advanced time stamps can be created within less than 50 ms. For qualified time stamps the time for generating the time stamp is limited by the technology of the signature creation device (for example, a SmartCard). About 1 to 2 seconds are required for a qualified time stamp having 2048 Bit encryption using the RSA algorithm (RSA—Rivest, Shamir and Adleman).

It can be provided that the first time stamp is provided in each case as an advanced or qualified time stamp. Furthermore it can be provided that the second time stamp is provided in each case as an advanced or qualified time stamp.

In a preferred embodiment, the first and second time stamps are each provided as advanced time stamps. This embodiment is particularly suitable for application on mobile devices, for example, Smartphones or tablets. In mobile devices the available memory is usually limited. The nested signature of the data stream by means of the first and second time stamp enables the memory requirement needed to be kept low since few representation values are each provided with an advanced time stamp and stored. As a result, for example hash trees by which means, for example, representation values can be generated, can remain small.

In another preferred further development of the disclosure, the first time stamp is in each case provided as an advanced time stamp and the second time stamp is in each case provided as a qualified time stamp. With this further development the data stream is very effectively secured again any manipulation. Advanced time stamps are assigned to data representation values which can also comprise very few or even only one data set. By this means relatively small units of the data stream can be reliably secured. In each case, one interval representation value is generated for one or more data representation values, to which a qualified time stamp is assigned. By this means a subsequent processing of the data stream is excluded so that the secured data object which comprises the data stream can be used as reliable and legally secure evidence.

It can be provided that the data sets of the data stream have a uniform size. Alternatively the data sets can also have different sizes. The data sets can, for example, be provided as single files or as container files which are interlinked in order to form the data stream. A container file in digital data processing is a file which for its part can contain different files or file types. The container files of a data stream can in turn have the same or different sizes.

A data representation value is assigned to the data sets which are each comprised by an interval having a first interval length. A check sum for the number of data sets in the interval can be formed, for example, as the data representation value. Alternatively or additionally, it can be provided that hash values arranged in a hash tree are assigned to each of the data sets by known methods. The tip of the hash tree then corresponds to the data representation value of the data sets. Consequently, the plurality of data sets in the interval are mapped onto a single data representation value.

An interval representation value is assigned to the data representation values which are each comprised by an interval having a second interval length. For example, the correction check sum of the data representation values in the interval can be formed as the interval representation value. Alternatively or additionally, for example, hash values arranged in a hash tree can be assigned to each of the data representation values. The tip of the hash tree corresponds to the interval representation value of the data representation values. Consequently, the plurality of data representation values in the interval of second interval length are mapped onto a single interval representation value.

The interval length of the first interval and/or of the second interval can be determined in various ways, which is explained as an example hereinafter.

Alternatively to the use in the clinical field, the method according to the disclosure can be used for other applications. An exemplary use is the monitoring or the traceability of the activity in highly sensitive security areas such as military installations, flight safety, operation of power plants, supply networks (power, gas, water, oil), the chemical, pharmaceutical and biotechnical industry, in particular in legally secure video monitoring. Furthermore, the method can be used in security areas in protection of objects and persons, in tunnels, railway systems, stations, airports and buildings/installations of all kinds. Furthermore, in the area of criminal police activity, audio-visual reproductions of defendant and witness hearings which can stand up in court and other evidence can be documented and archived by means of the method. Another exemplary application lies further in the field of insurance, banking and stock company law when implementing the mandatory counselling of consumers. The method can be used, for example, in video applications on smartphones, tablets, notebooks and embedded platforms for legally secure documentations of procedures and processes. The procedures and processes comprise, for example, determinations of construction defects by experts, automatic documentation of circumstances of accidents, recordings of damage, furnishing of evidence and quality assurance itself.

A preferred further development of the disclosure provides that the first interval length and/or second interval length are determined by a predefined number of data sets in the data stream. In this case, the interval length is determined by means of a simple counting of the data sets. For example, the end of the first or second interval can be determined by means of a polling method, whereupon the corresponding representation value is generated. In this case it is irrelevant whether the data sets are the same size or of different size. It can, for example, be provided that the first interval length each comprises four data sets and the second interval length each comprises twelve data sets.

In an expedient embodiment of the disclosure, it can be provided that the first interval length and/or second interval length are determined by a predefined time interval. It is particularly advantageous to specify a time interval if the data sets of the data stream have a uniform size.

An advantageous embodiment of the disclosure provides that the second interval length is an integer multiple of the first interval length.

A further development of the disclosure preferably provides that a time interval is predefined, at the end of the time interval it is checked whether a current data set which is received at the end of the time interval by the data processing device was received completely and depending on the result of the check, the first interval length and/or the second interval length are determined according to following criteria:

a) the first interval length and/or the second interval length are determined by the predefined time interval if the current data set was received completely at the end of the time interval or b) the first interval length and/or the second interval length are determined by a time after the end of the predefined time interval at which the current data set was received completely.

It is hereby ensured that an interval always comprises complete data sets even when a time interval for generating the time stamp is predefined. The size of the intervals is possibly not constant here. The predefined time interval can, for example, be 5 s long. If the current data set has been completely received when the 5 s expires, the interval is ended and the corresponding representation value is generated. This case is rather unlikely however. It is more probable that when the 5 s expires, the current data set has not yet been completely received. In this case, it is awaited until the current data set has been completely received. Only then is the interval ended and the corresponding representation value generated. The interval here can, for example, have a length of 5.7 s. After another 5 s has elapsed, it is again checked whether the then current data set has been completely received. If this should not be the case it is awaited until this has been completely received before the interval is ended. The interval can then, for example, have a length of 5.3 s. Both the first time interval and the second time interval can be determined by this means.

In an advantageous embodiment of the disclosure, it can be provided that upon receiving the first data set of the data stream in the data processing device a time stamp is received which is assigned to the first data set and the first data set is stored together with the assigned time stamp. By this means the beginning of the data stream is held securely. The time stamp can be received as an advanced or qualified time stamp.

An advantageous further development of the disclosure provides that upon receiving the last data set of the data stream in the data processing device, a time stamp is received which is assigned to the last data set and the last data set is stored together with the assigned time stamp. The end of the data stream is hereby held securely. The time stamp can be received as an advanced or qualified time stamp.

In an expedient further development of the disclosure, it can be provided that the data stream is provided as a video data stream which comprises a continuous sequence of image data sets. The image data sets can, for example, be prepared as individual images, as image container files or as a combination hereof. It can be provided that the video data stream comprises at least one digital watermark. The at least one watermark can, for example, be formed as a robust digital watermark and/or as a fragile digital watermark. The video data stream can comprise a single video signal, a plurality of video signals, a single and/or a plurality of three-dimensional video signals as well as a combination hereof. It can be provided to generate the image data sets by means of a variable length decoding. The video data stream can, for example, be provided as video, which was generated according to a compression process according to the known H.264 standard. The H.264 standard generates videos which, in addition to P and B frames, comprise I frames and IDR frames (IDR—instantaneous decoding refresh) which only contain non-compressed image data. Representation values can be generated from the I/IDR frames. The frequency of the IDR frames, i.e. the time interval between two IDR frames can be predefined by a user. The spacing of the IDR frames can, for example, agree with the first or second interval length. Between two successive IDR frames, an artefact-free editing of the video is not possible which provides additional security from forgery. An IDR frame determines the beginning or the end of a container file. Alternatively it can be provided that the video data stream is provided as video according to the known MPEG-4 ASP Standard. According to the MPEG-4 ASP Standard, I frames and P frames are provided, the P frames being linked to one another. Representation values can be generated from the I frames which only contain non-compressed image data. Between two successive I frames, an artefact-free editing of the video is not possible, which provides additional security from forgery. An I frame determines the beginning or the end of a container file.

In an expedient further development of the disclosure, it can be provided that in addition to the data stream, the data object comprises an audio data stream which comprises a continuous sequence of individual audio data sets, wherein the audio data stream is received by the data processing system and the method comprises the further following steps: —generating an audio data representation value in each case at the end of an interval having a third interval length, which is assigned to the audio data sets of the respective interval of third length, receiving a third time stamp assigned to the respective audio data representation value, storing the respective audio data representation value together with the assigned third time stamp, generating an audio interval representation value in each case at the end of an interval having a fourth interval length which is greater than the third interval length which is assigned to the audio data representation values of the respective interval of fourth length, receiving a fourth time stamp assigned to the respective audio interval representation value and storing the respective audio interval representation value together with the assigned fourth time interval.

The above explanations on the creation of the time stamp, the generation of the representation values, the size of the data sets and the determination of the interval lengths apply similarly for this embodiment. It can be provided that the third time stamp is in each case provided as an advanced or qualified time stamp. It can further be provided that the fourth time stamp is in each case provided as an advanced or qualified time stamp. The audio data stream can comprise a mono, a stereo or a multichannel signal.

A further development of the disclosure provides that the first interval length is equal to the third interval length and/or the second interval length is equal to the fourth interval length. As a result, the respectively first time stamp corresponds to the respectively third time stamps and/or the respectively second time stamp corresponds to the respectively fourth time stamps.

An advantageous further development provides that in addition to the data stream, the data object comprises an object data stream which is provided by means of a device which monitors a parameter of an object and which comprises a continuous sequence of individual object data sets, wherein the object data stream is received by the data processing system and the method comprises the further following steps:

generating an object data representation value in each case at the end of an interval having a fifth interval length which is assigned to the object data sets of the respective interval of fifth length, receiving a fifth time stamp assigned to the respective object data representation value, storing the respective object data representation value together with the assigned fifth time stamp, generating an object interval representation value in each case at the end of an interval having a sixth interval length which is greater than the fifth interval length which is assigned to the object data representation values of the respective interval of sixth length, receiving a sixth time stamp assigned to the respective object interval representation value and storing the respective object interval representation value together with the assigned sixth time stamp.

The above explanations on the creation of the time stamp, the generation of the representation values, the size of the data sets and the determination of the interval lengths apply similarly for this embodiment. It can be provided that the fifth time stamp is in each case provided as an advanced or qualified time stamp. It can further be provided that the sixth time stamp is in each case provided as an advanced or qualified time stamp. It can be provided to monitor a plurality of parameters of the object by means of the device and to provide the plurality of parameters for the object data stream. Additionally or alternatively it can be provided to monitor one or several parameters of several objects by means of one or more devices and to prepare the determined data for the object data stream.

A further development of the disclosure can provide that the fifth interval length corresponds to a clock speed of the device with which the parameter of the object is updated. It can be provided that the value of the parameter of the object is updated at certain time intervals by means of the device. The time intervals can be distributed regularly or irregularly. The fifth interval length can be adapted to the monitoring rhythm in order to receive a time stamp for each updated parameter value.

In a preferred embodiment it can be provided that the object data stream is provided by a medical device which monitors a state of a patient and the object data stream comprises at least one value from the following groups of values of the patient: heart rate, blood pressure, respiratory rate and brain waves. Alternatively it can be provided, for example, that the object data stream is provided by a device which determines and monitors the temperature of an object. Furthermore, it can alternatively be provided to monitor a movement status of the object by means of the device, for example, the position and/or the speed and/or the acceleration. According to a further alternative, it can, for example, be provided to monitor the course of a chemical reaction by means of the device and to determine reaction parameters.

According to another advantageous further development it is provided that the data object is encrypted following complete receipt of the data stream. The encryption prevents access of unauthorised persons to the data object and affords an additional protection against manipulations.

Further areas of applicability will become apparent from the description provided herein. The description and specific examples in this summary are intended for purposes of illustration only and are not intended to limit the scope of the present disclosure.

DRAWINGS

The disclosure is explained in more detail hereinafter by means of exemplary embodiments by reference to figures of a drawing. In the figures:

FIG. 1 shows a schematic diagram of a data stream and

FIG. 2 shows a schematic diagram of a system.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Example embodiments will now be described more fully with reference to the accompanying drawings.

FIG. 1 shows a schematic diagram of a data stream comprising a continuous sequence of data sets 1. At the end of an interval 2 having a first interval length, a data representation value is generated which is assigned to the data sets of the interval. For this purpose, for example, the check sum of the data sets can be formed in the interval. In the example shown, each interval 2 contains three data sets. It can be provided that the intervals comprise a different number of data sets. An advanced time stamp is received which is assigned to the respective data representation value. The respective data representation value is stored together with the assigned advanced time stamp, for example, on a storage medium.

An interval 3 having a second interval length comprises in the example shown respectively three intervals of first length. It can also be provided here that the intervals of second length comprise a different number of intervals of first length. At the end of the interval 3 an interval representation value is generated which is assigned to the data representation values of the interval 3. A qualified time stamp assigned to the interval representation value is received and stored together with the interval representation value.

FIG. 2 shows a schematic diagram of a system. A video recording device 4 is connected to a data processing device 5. The data processing device 5 is connected to a data storage device 6. The video recording device 4 can, for example, be a digital camera which preferably has two outputs. Via a first output the video signal is transmitted to a display device in the operating theatre. Via a second output the video signal is transmitted to the data processing device 5, for example, a desktop PC or a laptop. The method for digital signing of the video data stream is executed on the data processing device. The digitally signed data object is then stored in the data storage device 6. Optionally it can be previously encrypted.

The features of the disclosure disclosed in the preceding description, the claims and the drawing can be important both individually and in any combination for the implementation of the disclosure in its various embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for producing a secured data object by means of a data processing device, wherein a digital data stream which comprises a continuous sequence of data sets is received by the data processing system and the method comprises the following steps:
    grouping, by a processor of the data processing device, the continuous sequence of data sets into a plurality of intervals, each interval comprised of one or more data sets and having a first interval length;
    generating, by the processor of the data processing device, at the end of each interval, a respective data representation value for each interval;
    receiving, by the processor of the data processing device, a first time stamp assigned to the respective data representation value, where the first time stamp is an advanced time stamp;
    storing the respective data representation value together with the assigned first time stamp on a memory of the data processing device;
    further grouping, by the processor of the data processing device, the continuous sequence of data sets into one or more larger intervals, each larger interval comprised of two or more data sets forming the plurality of intervals and having a second interval length which is greater than the first interval length;
    generating, by the processor of the data processing device, at the end of each larger interval, an interval representation value for each larger interval,
    receiving, by the processor of the data processing device, a second time stamp assigned to the respective interval representation value, where the second time stamp is a qualified time stamp; and
    storing the respective interval representation value together with the associated second time stamp as a data object on the memory of the data processing device.

2. The method according to claim 1, wherein at least one of the first interval length and second interval length are determined by a predefined number of data sets in the data stream.

3. The method according to claim 1, wherein at least one of the first interval length and second interval length are determined by a predefined time interval.

4. The method according to claim 1, wherein the second interval length is an integer multiple of the first interval length.

5. The method according to claim 1, wherein the time interval is predefined, at the end of the time interval it is checked whether a current data set which is received at the end of the time interval by the data processing device was received completely and depending on the result of the check, at least one of the first interval length and the second interval length are determined according to following criteria:
    a) the first interval length and the second interval length are determined by the predefined time interval if the current data set was received completely at the end of the time interval or
    b) the first interval length and the second interval length are determined by a time after the end of the predefined time interval at which the current data set was received completely.

6. The method according to claim 1, wherein upon receiving the first data set of the data stream in the data processing device a time stamp is received which is assigned to the first data set and the first data set is stored together with the assigned time stamp.

7. The method according to claim 1, wherein upon receiving the last data set of the data stream in the data processing device a time stamp is received which is assigned to the last data set and the last data set is stored together with the assigned time stamp.

8. The method according to claim 1, wherein the data stream is provided as a video data stream which comprises a continuous sequence of image data sets.

9. The method according to claim 1, wherein in addition to the data stream the data object comprises an audio data stream which comprises a continuous sequence of individual audio data sets, wherein the audio data stream is received by the data processing system and the method comprises the further following steps:
    generating an audio data representation value in each case at the end of an interval having a third interval length, which is assigned to the audio data sets of the respective interval of third length;
    receiving a third time stamp assigned to the respective audio data representation value;
    storing the respective audio data representation value together with the assigned third time stamp;

generating an audio interval representation value in each case at the end of an interval having a fourth interval length which is greater than the third interval length which is assigned to the audio data representation values of the respective interval of fourth length;

receiving a fourth time stamp assigned to the respective audio interval representation value; and storing the respective audio interval representation value together with the assigned fourth time interval.

10. The method according to claim 9, wherein the first interval length is equal to the third interval length or the second interval length is equal to the fourth interval length.

11. The method according to claim 1, wherein in addition to the data stream, the data object comprises an object data stream which is provided by a device which monitors a parameter of an object and which comprises a continuous sequence of individual object data sets, wherein the object data stream is received by the data processing system and the method comprises the further following steps:

generating an object data representation value in each case at the end of an interval having a fifth interval length which is assigned to the object data sets of the respective interval of fifth length;

receiving a fifth time stamp assigned to the respective object data representation value;

storing the respective object data representation value together with the assigned fifth time stamp;

generating an object interval representation value in each case at the end of an interval having a sixth interval length which is greater than the fifth interval length which is assigned to the object data representation values of the respective interval of sixth length;

receiving a sixth time stamp assigned to the respective object interval representation value; and storing the respective object interval representation value together with the assigned sixth time stamp.

12. The method according to claim 11, wherein the fifth interval length corresponds to a clock speed of the device with which the parameter of the object is updated.

13. The method according to claim 11, wherein the object data stream is provided by a medical device which monitors a state of a patient and the object data stream comprises at least one value from the following groups of values of the patient: heart rate, blood pressure, respiratory rate and brain waves.

14. The method according to claim 1, wherein the data object is encrypted following complete receipt of the data stream.

15. System comprising a video recording device, a data processing device and a data storage device, wherein the video recording device is configured to transfer a data stream to the data processing device and the data processing device is configured to process the data stream by means of a method according to claim 1 and then store it as a secured data object in the data storage device.

* * * * *